United States Patent
Schloss et al.

(10) Patent No.: US 10,774,557 B1
(45) Date of Patent: Sep. 15, 2020

(54) POOL CLEANER WITH SELECTIVE INLET CONTROL

(71) Applicant: Aquatron Robotic Technology Ltd., Afula (IL)

(72) Inventors: Shahar Schloss, Haifa (IL); Gal Baruch, Yokneam (IL)

(73) Assignee: Aquatron Robotic Technology Ltd., Afula (IL)

( * ) Notice: Subject to any disclaimer, the term of this patent is extended or adjusted under 35 U.S.C. 154(b) by 0 days.

(21) Appl. No.: 16/281,115

(22) Filed: Feb. 21, 2019

(51) Int. Cl.
| | |
|---|---|
| *E04H 4/16* | (2006.01) |
| *B01D 35/02* | (2006.01) |
| *B01D 35/30* | (2006.01) |
| *B01D 29/96* | (2006.01) |
| *B01D 29/90* | (2006.01) |
| *B01D 37/04* | (2006.01) |

(52) U.S. Cl.
CPC ........... *E04H 4/1654* (2013.01); *B01D 29/90* (2013.01); *B01D 29/96* (2013.01); *B01D 35/02* (2013.01); *B01D 35/30* (2013.01); *B01D 37/04* (2013.01); *B01D 2201/16* (2013.01); *B01D 2201/265* (2013.01)

(58) Field of Classification Search
CPC ...... E04H 4/1654; B01D 29/96; B01D 37/04; B01D 35/30; B01D 35/02; B01D 29/90; B01D 2201/265; B01D 2201/16
USPC ............................... 210/167.16, 167.17, 767
See application file for complete search history.

(56) References Cited

U.S. PATENT DOCUMENTS

| | | |
|---|---|---|
| 8,012,345 B2 | 9/2011 | Hui |
| 8,397,331 B2 | 3/2013 | Pichon et al. |
| 8,505,142 B2 | 8/2013 | Erlich |
| 8,555,445 B2 | 10/2013 | Fu et al. |
| 8,590,090 B2 | 11/2013 | Porat et al. |
| 8,627,532 B2 | 1/2014 | Hui |
| 9,809,990 B1 | 11/2017 | Hui et al. |
| 9,896,856 B2 | 2/2018 | Tavor et al. |
| 10,087,646 B2 | 10/2018 | Tavor et al. |
| 2007/0028405 A1 | 2/2007 | Garti |
| 2007/0251032 A1 | 11/2007 | Pichon et al. |
| 2018/0142487 A1* | 5/2018 | Durvasula ............. E04H 4/1654 |

FOREIGN PATENT DOCUMENTS

EP 2900888 8/2015

* cited by examiner

*Primary Examiner* — Fred Prince
(74) *Attorney, Agent, or Firm* — Pearl Cohen Zedek Latzer Baratz LLP (57) ABSTRACT

A pool cleaner includes a housing with a plurality of inlets to enable inflow of water from a pool into the housing, and at least one outlet to enable outflow of water from the housing. A suction mechanism is configured to draw water into the housing through the inlets, and to expel the water through the outlet. A propulsion mechanism is configured to propel the pool cleaner over a floor of a pool. A controller is configured to control operation of at least the propulsion mechanism. A filter is configured to trap debris in the water that is drawn into the housing. An inlet control mechanism is configured to selectively enable the inflow of the water via a selected inlet of the plurality of inlets while preventing inflow through at least one other inlet of the plurality of inlets.

19 Claims, 4 Drawing Sheets

POOL CLEANER WITH SELECTIVE INLET CONTROL

FIELD OF THE INVENTION

The present invention relates to pool cleaners. More particularly, the present invention relates to a pool cleaner with selective inlet control.

BACKGROUND OF THE INVENTION

Automatic or robotic pool cleaners are often employed for routine pool cleaning and maintenance. Such cleaners typically include a hollow housing and an electrical pump or other suction device for drawing water from the pool through an inlet and into the housing. A filter or mesh is positioned so as to trap any debris that is suspended in the water that is drawn into the housing. The trapped debris may remain inside the pool cleaner until emptied, e.g., by a user of the pool cleaner. The pool cleaner is capable of self-propulsion along the inside of the pool. For example, propulsion may be provided by a water jet, or by motorized wheels or tracks.

Robotic or automatic pool cleaners often suffer from limited or degraded performance when operating close to the corners of a pool where the pool wall joins the pool floor. Since any dirt that falls into the pool from the pool deck tends to fall close to the wall and remain there, there is often a greater concentration of dirt near the corners than in the middle of the pool.

SUMMARY OF THE INVENTION

There is thus provided, in accordance with an embodiment of the present invention, a pool cleaner including: a housing including a plurality of inlets to enable inflow of water from a pool into the housing, and at least one outlet to enable outflow of water from the housing; a suction mechanism for drawing water into the housing through the plurality of inlets and for expelling the water through the at least one outlet; a propulsion mechanism for propelling the pool cleaner over a floor of a pool; a controller to control operation of at least the propulsion mechanism; at least one filter for trapping debris in the water that is drawn into the housing; and an inlet control mechanism configured to selectively enable the inflow of the water via a selected inlet of the plurality of inlets while preventing inflow through at least one other inlet of the plurality of inlets.

Furthermore, in accordance with an embodiment of the present invention, the inlet control mechanism is configured to enable inflow through a leading inlet of the plurality of inlets that is nearest to a leading end of the pool cleaner when the pool cleaner is being propelled, and to prevent inflow through a trailing inlet of the plurality of inlets that is nearest to a trailing end of the pool cleaner.

Furthermore, in accordance with an embodiment of the present invention, the inlet control mechanism is coupled to the propulsion mechanism by a coupling such that a reversal of direction of motion of the pool cleaner causes the inlet control mechanism to enable inflow through an inlet of the plurality of inlets that is the leading inlet after the reversal of the direction of motion, and to prevent inflow through an inlet of the plurality of inlets that is the trailing inlet after the reversal of the direction of motion.

Furthermore, in accordance with an embodiment of the present invention, the coupling includes a mechanical coupling.

Furthermore, in accordance with an embodiment of the present invention, the mechanical coupling includes an axle that is rotatable by the propulsion mechanism.

Furthermore, in accordance with an embodiment of the present invention, the mechanical coupling further includes two actuator arms that are each coupled to the axle via a unidirectional coupling, such that rotation of the axle in one direction rotates one of the two actuator arms, and such that rotation of the axle in an opposite direction rotates the other of the two actuator arms.

Furthermore, in accordance with an embodiment of the present invention, each of the two actuator arms is configured to engage a disk of the inlet control mechanism after the reversal of the direction of motion to rotate the disk in a direction of rotation of that actuator arm so as to enable the inflow through the leading inlet and to prevent the inflow through the trailing inlet.

Furthermore, in accordance with an embodiment of the present invention, each of the two actuator arms includes a projection that is configured to engage a different tab on the disk during at least a first rotation after the reversal of direction.

Furthermore, in accordance with an embodiment of the present invention, the disk is coupled to a crank that is configured to move a component to enable the inflow through the leading inlet and to prevent the inflow through the trailing inlet.

Furthermore, in accordance with an embodiment of the present invention, the controller is further configured to operate the inlet control mechanism in accordance with a direction of motion of the pool cleaner.

Furthermore, in accordance with an embodiment of the present invention, the inlet control mechanism includes an electromechanical actuator.

Furthermore, in accordance with an embodiment of the present invention, the actuator includes a servomotor.

Furthermore, in accordance with an embodiment of the present invention, the actuator includes a solenoid.

Furthermore, in accordance with an embodiment of the present invention, each inlet of the plurality of inlets includes a one-way valve to enable inflow of water through that inlet, and to prevent outflow of water through that inlet, wherein the inlet control mechanism is configured to prevent inflow through that outlet by locking closed the one-way valve.

Furthermore, in accordance with an embodiment of the present invention, the one-way valve includes a flap, wherein the inlet control mechanism includes at least one tab that is slidable onto the flap to lock the flap in a closed position.

Furthermore, in accordance with an embodiment of the present invention, the at least one tab includes two tabs at opposite ends of a rod, wherein the inlet control mechanism is configured to slide the rod along its length to slide one of the tabs onto a flap nearest to one end of the of pool cleaner while removing the other tab from a flap nearest to an opposite end of the pool cleaner.

Furthermore, in accordance with an embodiment of the present invention, the inlet control mechanism includes a plurality of covers, each of the covers placeable over an inlet of the plurality of inlets.

Furthermore, in accordance with an embodiment of the present invention, two covers of the plurality of covers are located at opposite ends of a rod, wherein the inlet control mechanism is configured to slide the rod along its length to slide one of the two covers onto an inlet of the plurality of inlets that is nearest to one end of the of pool cleaner while removing the other cover of the two covers from an inlet of the plurality of inlets that is nearest to an opposite end of the pool cleaner.

There is further provided, in accordance with an embodiment of the present invention, a method of controlling inflow through inlets of a pool cleaner, the method including: by a controller of the pool cleaner, operating a propulsion mechanism of the pool cleaner to propel the pool cleaner over a floor of a pool concurrently with operation of a suction mechanism to draw water into a housing of the pool cleaner through a plurality of inlets and into a filter configured to trap debris in the water, and to expel the water through an outlet of the housing so as to trap debris in the water in the filter; and when the propulsion mechanism reverses a direction of motion of the pool cleaner, by the controller, controlling an inlet control mechanism of the pool cleaner to enable inflow of the water via a leading inlet of the plurality of inlets while preventing inflow through a trailing inlet of the plurality of inlets.

Furthermore, in accordance with an embodiment of the present invention, controlling the inlet control mechanism includes enabling a one-way valve of the leading inlet to open to enable the inflow, and preventing the inflow includes preventing the one-way valve of the trailing inlet from opening.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, a robotic pool cleaner is provided with a plurality of inlets and an inlet control mechanism for selectively enabling or blocking inflow of water from the pool through each of the inlets. The inlets enable inflow of the water into a filter (e.g., inside a housing of the robotic pool cleaner, or located outside the housing) in which debris is removed from the flowing water. Typically, each inlet is positioned on a bottom surface of the robotic pool cleaner such that the inlet faces the floor of the pool as the robotic pool cleaner is propelled by a propulsion mechanism across a floor of the pool.

A suction mechanism is configured to draw water inward from the pool through an inlet through which inflow is enabled. For example, the suction mechanism may include a pump (e.g., an axial pump, centrifugal pump, or other type of pump) or impeller, or other mechanism for forcing water to flow into the robotic pool cleaner. The pump may be located either inside a housing of the robotic pool cleaner, or may be mounted outside of the housing, applying the suction via a conduit, e.g., a flexible tube or pipe, or other conduit. The indrawn water is then drawn through a filter that traps any debris that is suspended in the indrawn water. In some cases, the filter may include a mesh that traps debris in a chamber that is housed within an exterior cover of the robotic pool cleaner. In some cases, the filter may include a porous bag or pouch that is held within the exterior cover. The action of the pump expels the filtered water through an outlet of the robotic pool cleaner. In some cases, the outlet is located on a top surface of the robotic pool cleaner, e.g., on a surface that faces away from an interior surface of the pool along which the robotic pool cleaner is being propelled.

Although reference is made herein to pools and water in the pool, a robotic pool cleaner as described herein may be configured to operate in other types of containers of other types of liquids. Therefore, any reference herein to a pool should be understood as including reference to a tank, vat, or other container within which a robotic pool cleaner may operate to clean the interior. References herein to "water", "water flow", "waterline", or similar concepts should be understood as referring to equivalent concepts for other types of liquids.

For example, a propulsion system of the robotic pool cleaner may be configured to propel the robotic pool cleaner in either direction along a longitudinal axis of the pool cleaner. Therefore, when the pool cleaner is propelled in one direction along the axis, an end of the robotic pool cleaner facing the direction toward which the pool cleaner is being propelled is the leading end, and the opposite end along the axis is the trailing end. When motion along the axis is reversed, the end that previously functioned as the trailing end begins to function as the leading end, and the previously leading end becomes the trailing end. In other examples, the propulsion mechanism may be configured to propel the robotic pool cleaner along two or more axes, such that more than two sides of the pool cleaner may each function at times as a leading end.

The propulsion mechanism may include an electric motor or plurality of motors that are configured to drive wheels, tracks, brushes, rollers, or other components to propel the pool cleaner over the floor and, in some cases, walls of the pool. A drive motor may be connected to a propulsion wheel or other component via a transmission that may include one or more pulleys, pinions, or gears. In some cases, a drive motor may also drive other components of the robotic pool cleaner (e.g., one or more components of a suction mechanism). Alternatively or in addition, the robotic pool cleaner may be propelled by a water jet that is formed by the suction pump. Alternatively, a motor or propeller may be configured to create a water jet. Steering and directional control of the pool cleaner may be effected by one or more of differential operation of propulsion drive motors or transmissions, by differential operation of water jets, by deflection of a water jet, by shifting masses within the pool cleaner, or otherwise. Electric motors for the propulsion and suction mechanisms, as well as any electronic control circuits or components (e.g., a programmable micro-controller or micro-computer, or other electrical or electronic components, e.g., for controlling the operation of the propulsion and suction systems) may be enclosed in one or more watertight housings.

The inlet control mechanism may be configured such that an inlet that is nearest to the leading end of the robotic pool cleaner, or to the direction toward which the robotic pool cleaner is moving, is opened or is allowed to open, while other inlets are closed or are locked in a closed position. In some cases, e.g., where two or more inlets are arranged along sides of the robotic pool cleaner, some or all of the inlets that are at the leading end may be opened. In this manner, when the robotic pool cleaner is traveling along a floor of the pool and the leading end approaches a wall of the pool, the open inlet may be positioned such that suction is preferentially applied to the junction between the wall and the floor, e.g., where debris or dirt is likely to collect.

For example, each inlet may be provided with a one-way valve, e.g., in the form of an inwardly bendable flap or trapdoor. The one-way valve is configured to enable inflow of water that is drawn in by the suction mechanism. The valve closes when water is not being drawn in (e.g., when the suction mechanism is idle or turned off, or when the inlet is above the waterline of the pool) to prevent outflow through the inlet of water that possibly includes suspended dirt or debris.

In an example of an inlet control mechanism, the inlet control mechanism may be configured to lock the valve of an inlet that is near the trailing end of the robotic pool cleaner, while one or more inlets that are nearest to the leading end of the robotic pool cleaner are free to open. A latching mechanism may be coupled to the propulsion mechanism of the robotic pool cleaner (e.g., either a motorized drive wheel or a passive idler wheel). For example, the coupling mechanism may be coupled to the wheel by one or more belts, pulleys, pinions, gears, or other mechanical coupling mechanisms. Alternatively or in addition, rotation of the wheel may trigger an electrical switch that operates a motorized latching mechanism. Rotation of the wheel in one direction may then cause the inlet control mechanism to cause a latching structure to unlatch the one-way valve of the inlet nearest to the leading end, while latching shut the one-way valve of an inlet at a trailing end. For example, a latch for each inlet valve at opposite ends of the robotic pool cleaner may be connected to, or incorporated into, a single slidable rod or bar. When the bar of the latching mechanism is slid in one direction, the latch at one end of the bar is slid onto a valve (e.g., flap or trapdoor) to lock that valve shut, while the latch at the other end of the bar is slid off of the valve, allowing that valve to open. A latch that is slid onto a valve may be in contact with the valve (e.g., flap or trapdoor), or may be located above the valve at a distance that is short enough to prevent intake of water through that valve.

As another example, each inlet may be provided with a cover that is placeable over that inlet to prevent inflow. The inlet control mechanism may be configured to open the cover on an inlet near a leading end of the robotic pool cleaner, and to close an inlet near a trailing end of the robotic pool cleaner. For example, the covers may each be mounted on opposite ends of a bar or rod. The length of the bar is designed such that when the bar is slid completely toward one end of the robotic pool cleaner, an inlet at that end is covered while the inlet at the opposite end is exposed. For example, a cover mechanism that is coupled mechanically, electrically, or electronically to a wheel of the robotic pool cleaner may be configured to slide the bar in a direction that is opposite the direction of motion of the wheel. For example, a controller that controls the propulsion system of the robotic pool cleaner may control a bell crank mechanism to slide the bar along its longitudinal axis.

In another example, a locking tab may be mechanically coupled to a flap that is configured to divert a propelling jet of water upstream of the pump. The inlet control mechanism may be configured such that, when operation of the pump is briefly halted, a spring moves the flap to an alternate position, thus locking one flap while unlocking the other. When the pump is restarted, the outflow or jet from the pump is directed to a direction opposing the first direction, thus reversing the pool cleaner's direction of travel.

In another example, an electromechanical actuator, for example a solenoid or a servomotor, is configured to move a locking tab so as to close the one-way valve of one inlet opening while enabling another to open. For example, a single actuator may activate two or more locking tabs, at least one for each inlet opening, so that a single motion may unlock one inlet opening while locking another. The actuator may be controlled by an electronic controller, which may also control a propulsion motor which determines a direction of travel. Alternatively or in addition, a proximity sensor or contact sensor, e.g., a micro-switch, may detect proximity or contact with a pool wall, and activate the inlet control mechanism actuator to selectively lock closed one inlet opening and enable the other to open.

In another example, an unpowered idler wheel is typically in contact with the pool floor when the robotic pool cleaner travels along the pool floor. An axle of the idler wheel may be configured to cause the inlet control mechanism to change the locking of the inlet openings when the rotation of the idler wheel changes its direction of rotation.

In another example, locking tabs may be manually engaged by an operator of the pool cleaner so as to select which inlet openings are enabled to open during a cleaning cycle.

A robotic pool cleaner as described herein, that includes multiple inlets and an inlet control mechanism to selectively enable or prevent opening of the inlets may be advantageous over other types of robotic pool cleaners. A robotic pool cleaner as described herein enables an inlet to be placed close to the sides of the pool where the floor and walls meet, and where dirt and debris is likely to accumulate. By opening only an inlet that is close to the side, while closing all inlets that are located on other sides of the robotic pool cleaner, the generated suction force may be concentrated at the open inlet to create an inflow that is stronger than the force that would be applied to several concurrently open inlets.

On the other hand, a pool cleaner that includes a single inlet at an edge of the hollow housing would clean effectively only when the end with the inlet is the leading end (or would be limited to travel with the inlet facing forward). A pool cleaner with two or more inlets that are always open would increase the load on the suction mechanism without increasing cleaning capability, since the inlet at the leading end typically would draw in most of the debris.

Figure 1A:
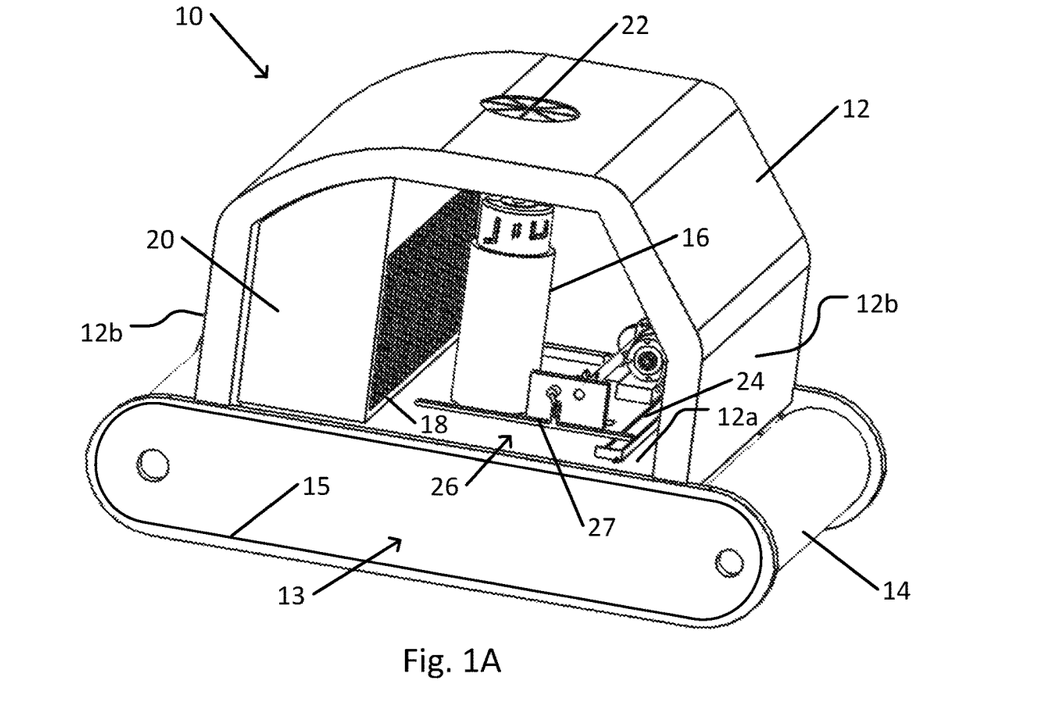
FIG. 1A schematically illustrates a robotic pool cleaner with an inlet control mechanism, in accordance with an embodiment of the present invention.
Figure 1B:
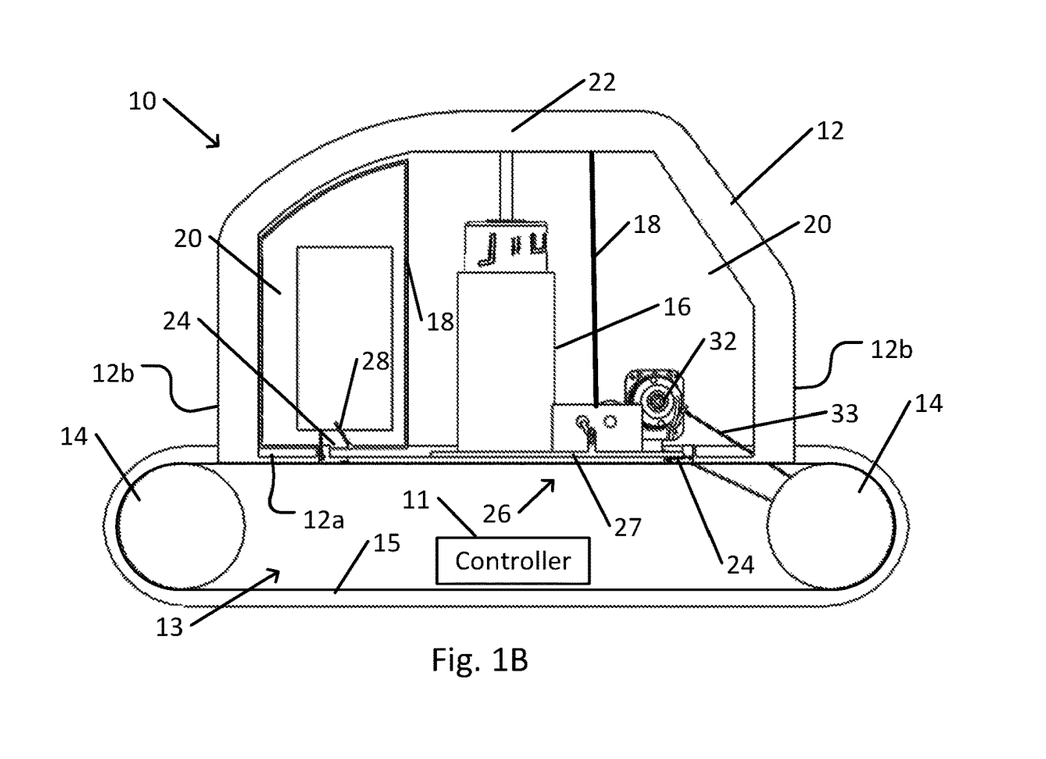
FIG. 1B is a schematic cross section of the pool cleaner shown in FIG. 1A.

FIG. 1A schematically illustrates a robotic pool cleaner with an inlet control mechanism, in accordance with an embodiment of the present invention. FIG. 1B is a schematic cross section of the pool cleaner shown in FIG. 1A.

Robotic pool cleaner 10 is configured to self-propel along a floor or other surface of a pool. Operation of components of robotic pool cleaner 10 may be controlled by controller 11. Controller 11 may include one or more processors, e.g., configured to operate in accordance with programmed instructions, for controlling operation of robotic pool cleaner 10. Pool cleaner housing 12 is configured to house various components of robotic pool cleaner 10. (In the figures, a side wall and other parts of pool cleaner housing 12 are not shown to enable display of interior components of the examples shown. It should be noted that the figures are not drawn to scale, and relative sizes of components that are shown may not be accurate.) For example, pool cleaner housing 12 may form part of an interior chamber for holding debris that is trapped from the water in the pool. In some cases, pool cleaner housing 12 may incorporate or enclose various internal compartments or partitions that are intended to isolate some internal regions of pool cleaner housing 12 from water in the pool. In particular, one or more electrical or electronic components of robotic pool cleaner 10 (e.g., motors, electronic circuitry, sensors, batteries, or other electrical or electronic components) may be enclosed in one or more watertight enclosures or compartments (e.g., separate from or internal to pool cleaner housing 12) to prevent contact of those components with water.

Propulsion system 13 of robotic pool cleaner 10 is configured to propel robotic pool cleaner 10 along a pool surface, e.g., a floor or wall of a pool. When robotic pool cleaner 10 travels along a pool surface, wheels 14 are turned. In the example shown, tracks 15 rotate about wheels 14. For example, wheels 14 may represent drive wheels that may be driven by a motor and transmission of propulsion system 13 to provide a propelling force. In some cases, wheels 14 may represent passive idler wheels that enable robotic pool cleaner 10 to travel over the pool surface while a propelling force is otherwise provided by the propulsion system (e.g., via a fluid jet, propeller, paddle, or other propelling component).

Suction mechanism 16 of a suction system of robotic pool cleaner 10 is configured to draw water into pool cleaner housing 12 via at least one inlet opening 24, and to force the water out of pool cleaner housing 12 via at least one outlet opening 22. Each inlet opening 24 is located so that water that is drawn into inlet opening 24 is drawn in from the direction of a surface of the pool along which robotic pool cleaner 10 is being propelled. In the example shown, each inlet opening 24 is located on a baseplate 12a of pool cleaner housing 12 that faces the surface along which robotic pool cleaner 10 is being propelled. Baseplate 12a may, in some examples, be removable from the remainder of pool cleaner housing 12, e.g., to enable access to internal components of robotic pool cleaner 10, e.g., for removing trapped debris, for cleaning, or for otherwise servicing robotic pool cleaner 10. Alternatively or in addition, an inlet opening 24 may be located on a lateral side 12b of pool cleaner housing 12, e.g., at an edge of lateral side 12b that is closest to baseplate 12a.

For example, suction mechanism 16 may include a pump, impeller, or other mechanism that is configured to cause a flow of water within pool cleaner housing 12 from inlet opening 24 to outlet opening 22. Suction mechanism 16 may be powered by an electric motor or otherwise. In some cases, a motor that powers the propulsion mechanism of robotic pool cleaner 10 may also power (e.g., via a separate transmission) suction mechanism 16.

Each inlet opening 24 is provided with a one-way valve 28. In the example shown, one-way valve 28 includes an inwardly bendable or rotatable flexible or hinged flap. When water is flowing inward, the force of the inwardly flowing water may rotate the flap of one-way valve 28 inward, enabling inflow of water through inlet opening 24. When the inflow ceases, e.g., when suction mechanism 16 is not operating, the flap may rotate downward to cover the inner side of inlet opening 24. For example, resilience in a flexible flap or hinge, or that is provided by a spring or other elastic component that is attached to a (e.g., rigid) flap of one-way valve 28, may close the flap in the absence of inflow. Thus, one-way valve 28 may close to prevent outflow of water through inlet opening 24.

Water that flows inward through an inlet opening 24 flows into debris filter 20. The water flows from debris filter 20 through filter mesh 18 and outward through outlet opening 22. For example, debris filter 20 may include a removable chamber that may be removed when a panel of pool cleaner housing 12 is opened or removed. In another example, debris filter 20 may include a chamber that is integral to, and not removable from, pool cleaner housing 12. In this example, debris may be removed from the integral chamber by opening or removing a panel of pool cleaner housing 12, and by tilting robotic pool cleaner 10 or otherwise removing debris (e.g., using suction, e.g., as provided by a vacuum cleaner) from the integral chamber.

In the example shown, filter mesh 18 includes a panel with a mesh through which water may flow out of debris filter 20. The openings in the mesh are sufficiently small such that debris with a dimension that is larger than the opening size cannot pass. Alternatively or in addition to a single mesh panel, filter mesh 18 may include a three dimensional structure of which at least some of the walls include mesh surfaces. In some cases, filter mesh 18 may include a series of meshes through which the water may flow. For example, the opening size of each successive mesh through which the water passes may be smaller than the opening size of the previous mesh (e.g., to enable trapping of smaller debris particles without clogging or impairing function of a fine mesh with large debris particles). Alternatively or in addition to mesh panel, filter mesh 18 may include one or more porous bags, sacks, or pouches through which water may flow while suspended debris is trapped within the bag.

Inlet control mechanism 26 is configured to selectively enable inflow through one or more inlet openings 24 while blocking inflow through one or more others. In the example shown, robotic pool cleaner 10 is capable of movement along the axis defined by wheels 14 and tracks 15. In the example shown, robotic pool cleaner 10 includes two inlet openings 24, one near each end of pool cleaner housing 12 along the axis of movement. Thus, in the example shown, inlet control mechanism 26 may operate to open an inlet opening 24 that is nearest to the current direction of motion of robotic pool cleaner 10 and to close the other inlet opening 24.

For example, coupling mechanism 32 may couple inlet control mechanism 26 to the propulsion mechanism of robotic pool cleaner 10. In the example shown, coupling mechanism 32 couples inlet control mechanism 26 to wheel 14 via pulley 33. Typically, a coupling mechanism 32 may include one or more gears, clutches (e.g., friction clutch), pawl and ratchet mechanisms, levers, or other mechanisms for coupling inlet control mechanism 26 to propulsion system 13. The coupling may be configured e.g., via a one-way clutch or pawl and ratchet, such that inlet control mechanism 26 locks a trailing inlet opening 24 while enabling a leading inlet opening 24 to open.

In the example shown, inlet control mechanism 26 includes bar 27 that may be slide such that one end of bar 27 covers and holds shut one-way valve 28 (e.g., a flap) of one inlet opening 24 while enabling one-way valve 28 of the other inlet opening 24 to open. For example, inlet control mechanism 26 may slide bar 27 in a direction that is opposite a current direction of motion (e.g., as determined by coupling mechanism 32) so as to cover one-way valve 28 of the inlet opening 24 at a trailing end of robotic pool cleaner 10. Inlet control mechanism 26 may include a bell crank or other mechanism that enables a motion that is transmitted to inlet control mechanism 26 by coupling mechanism 32 to slide bar 27 in a direction that is opposite to the direction of motion of wheels 14.

Other types of inlet control mechanisms may be used. For example, an inlet control mechanism may include locking tabs for preventing opening of a flap of a one-way valve 28.

Figure 2A:
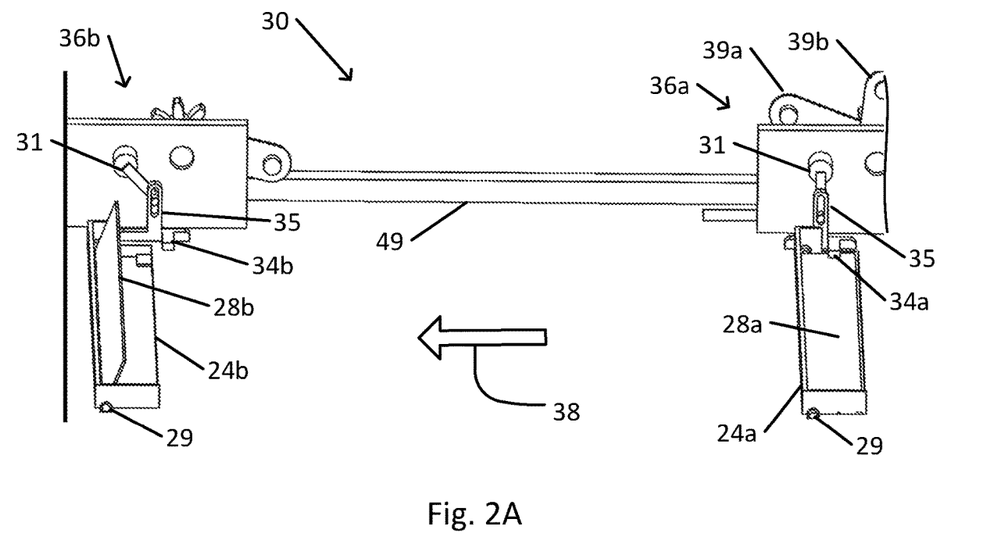
FIG. 2A schematically illustrates an example of an inlet control mechanism with locking tabs.
Figure 2B:
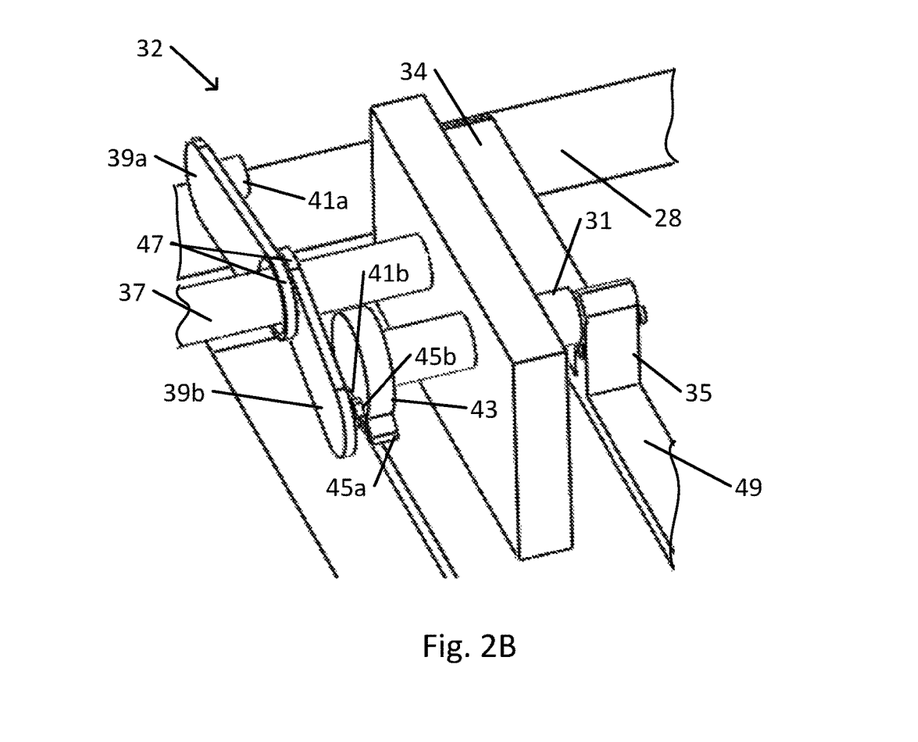
FIG. 2B schematically illustrates an example of a mechanism for coupling the inlet control mechanism shown in FIG. 2A to a propulsion system.

FIG. 2A schematically illustrates an example of an inlet control mechanism with locking tabs. FIG. 2B schematically illustrates an example of a mechanism for coupling the inlet control mechanism shown in FIG. 2A to a propulsion system.

In the example shown, the direction of motion of robotic pool cleaner 10 is indicated by arrow 38. Therefore, valve flap 28b of leading inlet opening 24b is opened, while valve flap 28a of trailing inlet opening 24a is closed.

In the example shown, each valve flap 28a or 28b is configured to rotate about its hinge axis 29, e.g., when pushed open by inflowing water. Inlet control mechanism 30 is configured to hold in a closed position valve flap 28a of trailing inlet opening 24a. In the example shown, inlet control mechanism 30 is configured to hold valve flap 28a in a closed position by sliding locking tab 34a over valve flap 28a. Sliding locking tab 34a over valve flap 28a may close valve flap 28a and hold it shut as long as robotic pool cleaner 10 is traveling in the direction of arrow 38. For example, a coupling mechanism 32 may couple tab movement mechanism 36 to a wheel 14 of robotic pool cleaner 10 or to a motor that drives wheel 14. Thus, when robotic pool cleaner 10 travels in the direction of arrow 38, tab movement mechanism 36a may move locking tab 34a onto valve flap 28a and keep it there until the motion of robotic pool cleaner 10 stops or changes direction.

In the example shown, each tab movement mechanism 36a and 36b includes a rotatable crank 31 (e.g., coupled to a wheel 14 by a coupling mechanism 32) that is configured to slide slotted tab 35 that is connected to one of locking tabs 34a and 34b. Alternatively or in addition, another mechanism (e.g., a bell crank mechanism or other mechanism) may be configured to convert rotation of the rotatable component to linear motion of locking tab 34a or 34b.

In the example shown, actuator arms 39a and 39b are rotatable in opposite directions by rotation of axle 37. Axle 37 may be coupled to a motor of the propulsion system by a gear, pulley, or other coupling mechanism. Each of actuator arms 39a and 39b may be engaged by axle 37 by unidirectional coupling 47. For example, unidirectional coupling 47 may include a ratchet mechanism or other unidirectional coupling mechanism. Unidirectional coupling 47 is configured to rotate actuator arm 39a or 39b to axle 37 when axle 37 rotates in one direction, but not when axle 37 rotates in the opposite direction. Unidirectional couplings 47 of actuator arms 39a and 39b may be oriented oppositely to one another such that rotation of axle 37 in one direction rotates only actuator arm 39a, while rotation of axle 37 in the opposite direction rotates only actuator arm 39b.

When the rotation of axle 37 begins to rotate actuator arm 39a, the first rotation of actuator arm 39a may cause projection 41a on actuator arm 39a to engage tab 45a on the outer perimeter of actuator disk 43. Rotation of actuator disk 43 may rotate crank 31 in one direction, e.g., to cause locking tab 34 to move onto (as in the example shown) or off of valve flap 28. During the following rotation of actuator arm 39a, tab 45a will have been rotated out of the path of projection 41a such that actuator disk 43 and locking tab 34 remain in position. On the other hand, when the rotation of axle 37 in the opposite direction begins to rotate actuator arm 39b, the first rotation of actuator arm 39b may cause projection 41b on actuator arm 39b to engage tab 45b on the face of actuator disk 43. Thus, actuator arm 39b may rotate actuator disk 43 and cause crank 31 to rotate in the opposite direction, e.g., to change the position of locking tab 34 off of (as in the example shown) or onto valve flap 28. During the following rotation of actuator arm 39b, tab 45b will have been rotated out of the path of projection 41b such that actuator disk 43 and locking tab 34 remain in position.

Other types of mechanisms may be used to couple the propulsion mechanism to a tab movement mechanism 36 without impeding rotation of wheel 14.

In the example shown, tab movement mechanism 36a is coupled to tab movement mechanism 36b by coupling rod 49. The coupling via coupling rod 49 may ensure that, when locking tab 34a is moved onto valve flap 28a, locking tab 34b is slid off of valve flap 28b. Thus, only one of tab movement mechanism 36a and 36b need be coupled to propulsion system 13 via a coupling mechanism 32, the other being coupled via coupling rod 49. Alternatively or in addition, each of tab movement mechanisms 36a and 36b may be mechanically coupled separately to propulsion system 13 of robotic pool cleaner 10. Alternatively or in addition, one or both of tab movement mechanisms 36a and 36b may be coupled electronically to propulsion system 13. For example, controller 11 may control propulsion system 13 to reverse or change a direction of travel of robotic pool cleaner 10. Controller 11 may similarly operate an electric motor (e.g., a servomotor) or solenoid of inlet control mechanism 30 to change the positions of locking tabs 34a and 34b.

Alternatively or in addition to a mechanism for locking closed or unlocking a one-way valve 28 or a valve flap 28a or 28b of such a valve, an inlet control mechanism may include other mechanisms for preventing or enabling inflow of water through an inlet opening 24. For example, an inlet control mechanism may be configured to selectively cover each inlet opening 24 with a shutter mechanism.

Figure 3:
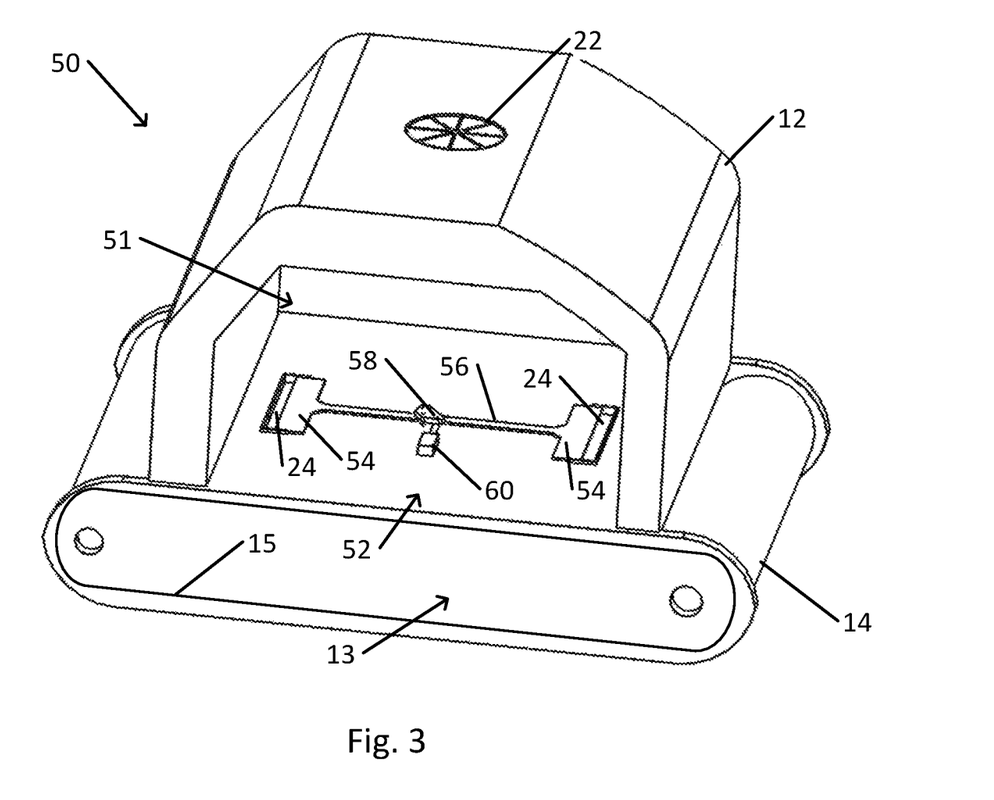
FIG. 3 schematically illustrates an example of a robotic pool cleaner with an inlet control mechanism that includes a shutter mechanism.
Figure 4:
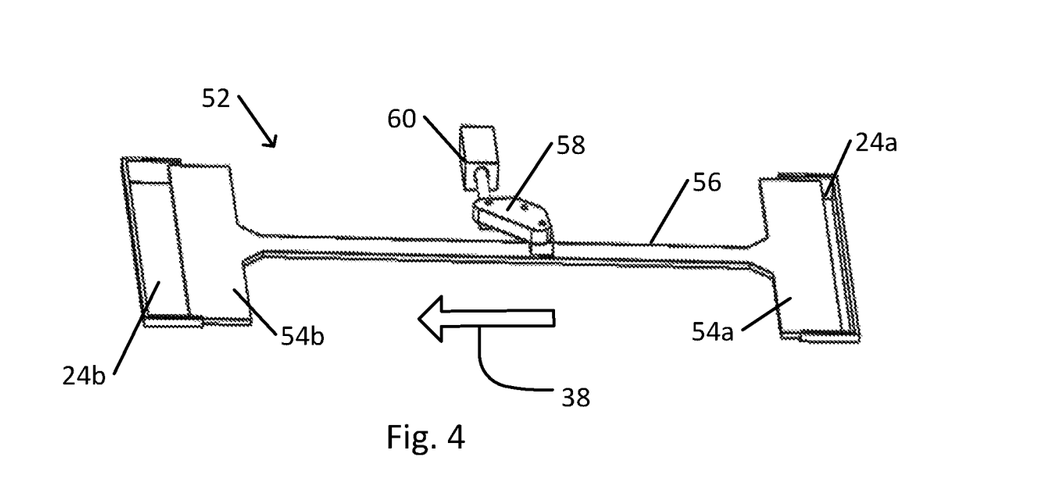
FIG. 4 schematically illustrates an example of the shutter mechanism of the robotic pool cleaner shown in FIG. 3.

FIG. 3 schematically illustrates an example of a robotic pool cleaner with an inlet control mechanism that includes a shutter mechanism. FIG. 4 schematically illustrates an example of the shutter mechanism of the robotic pool cleaner shown in FIG. 3.

In FIG. 3, interior components of robotic pool cleaner 50 are not shown for clarity. Interior cavity 51 may include one or more debris filters. For example, a debris filter may include a chamber that includes a filter surface through which water may flow out of the chamber an out through outlet opening 22. Alternatively or in addition, the debris filter may include one or more porous bags or sacks each whose opening covers one or more inlet openings 24, and whose porous sides enable outflow of water while trapping debris inside the bag.

Inlet control mechanism 52 of robotic pool cleaner 50 is configured to selectively remove an inlet cover 54 from at least one inlet opening 24 to enable inflow of water through that inlet opening 24. For example, the uncovered inlet opening 24 may be at a leading end of robotic pool cleaner 50. When uncovering one inlet opening 24, inlet control mechanism 52 may be configured to place an inlet cover 54 over another inlet opening 24, e.g., an inlet opening 24 at a trailing end of robotic pool cleaner 50, so as to prevent inflow of water through the covered inlet opening 24.

In the example shown, inlet opening 24b is at a leading end when pool cleaner 50 is traveling in the direction indicated by arrow 38, and inlet opening 24a is at a trailing end. Thus, in the example shown, inlet control mechanism 52 has placed inlet cover 54a so as to cover inlet opening 24a and prevent inflow through inlet opening 24a, and has removed inlet cover 54b from inlet opening 24b so as to enable inflow through inlet opening 24b. In the example shown, a one-way valve to prevent outflow through each inlet opening 24 is located elsewhere, e.g., at an inlet to a debris filter.

In the example shown, inlet control mechanism 52 is configured to concurrently uncover one of inlet openings 24a or 24b while covering the other. Both of inlet covers 54a and 54b are located at opposite ends of inlet cover bar 56. For example, bar actuator 60 may include a solenoid or an electric motor that is connected by control or other circuitry to propulsion system 13 of robotic pool cleaner 50. In this example, bar actuator 60 may operate bell crank 58, e.g., in response to a voltage or other signal that is indicative of a direction of motion, or of a change in direction of motion, of robotic pool cleaner 50. Alternatively or in addition, an actuator (e.g., a solenoid) may be configured to exert a force parallel to inlet cover bar 56. Alternatively or in addition, bar actuator 60 may be mechanically coupled to a component (e.g., wheel 14 or axle) of propulsion system 13 of robotic pool cleaner 50.

Alternatively or in addition, inlet control mechanism 52 may include separate mechanisms for operating each inlet cover 54. For example, a separate actuator for each inlet cover 54 may be individually coupled to propulsion system 13 of robotic pool cleaner 50.

Figure 5:
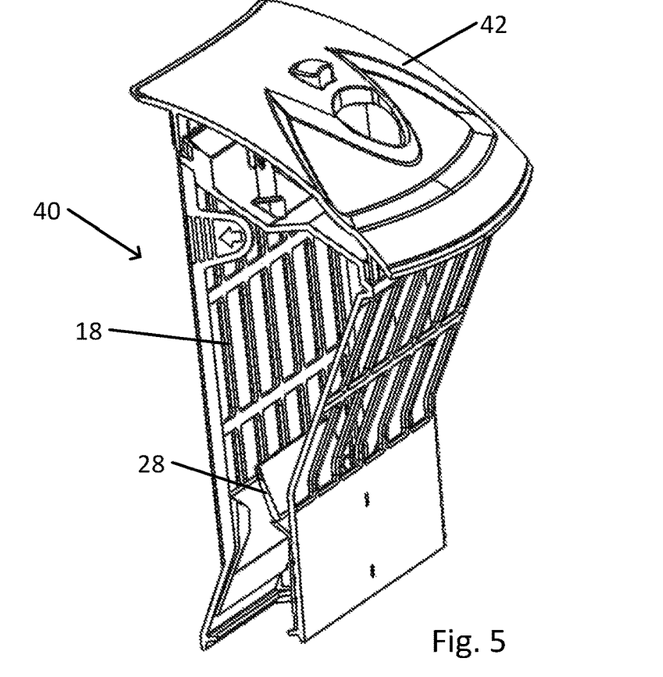
FIG. 5 schematically illustrates an example of a filter of the robotic pool cleaner 10 shown in FIG. 3.

FIG. 5 schematically illustrates an example of a filter of the robotic pool cleaner 10 shown in FIG. 3.

One or more filters 40 may be mounted inside pool cleaner housing 12. In the example shown, one filter 40 is typically placed over each inlet opening 24. For example, in a robotic pool cleaner similar to robotic pool cleaner 50, two such filters 40 may be placed inside pool cleaner housing 12.

In the example shown, filter 40 is provided with a one-way valve 28 that is configured to be located above inlet opening 24 when filter 40 is installed in robotic pool cleaner 50. Thus, water may flow into filter 40 from inlet opening 24 via one-way valve 28 and may be prevented by one-way valve 28 from flowing out of filter 40 and into the pool.

Water may be drawn out of filter 40 by a suction mechanism 16 via filter mesh 18 (which, when drawn to scale, typically has smaller openings than in the example shown).

When installed in a robotic pool cleaner such as robotic pool cleaner 50, filter 40 may be covered by access panel 42. For example, access panel 42 may represent a top panel of pool cleaner housing 12. Opening or removal of access panel 42 may enable removal of filter 40 from robotic pool cleaner 50, e.g., to enable disposal of the contents of filters 40.

Figure 6:
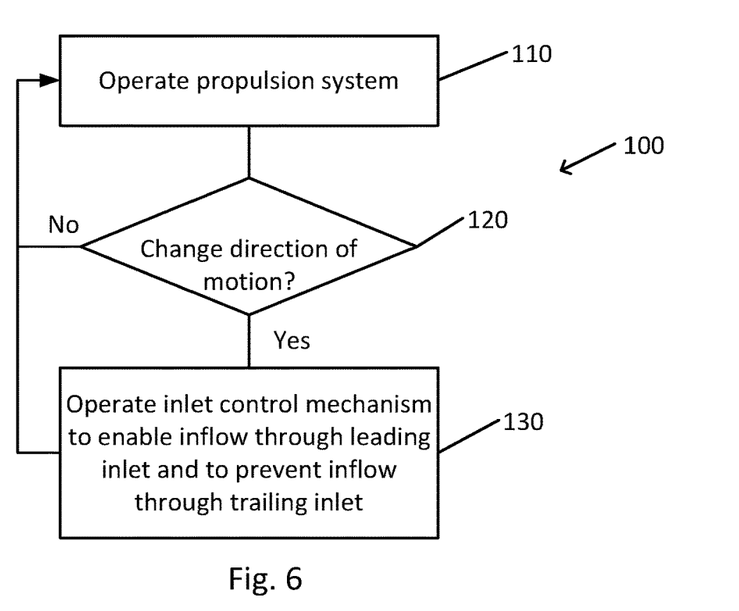
FIG. 6 is a flowchart depicting a method of controlling inflow through inlets of the robotic pool cleaner in accordance with an embodiment of the present invention.

FIG. 6 is a flowchart depicting a method of controlling inflow through inlets of the robotic pool cleaner in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Inlet control method 100 may be executed by a processor or control circuitry of a controller of a robotic pool cleaner, or by an arrangement of mechanical components, of an robotic pool cleaner described herein, e.g., such as robotic pool cleaner 10 or 50. It may be noted that components and features of different robotic pool cleaners as described herein may be combined in ways other than those described. In particular, any type of inlet control (e.g., locking tab, moveable cover, or other types) may be operated by mechanical coupling or electromechanical coupling (e.g., via a controller or control circuitry) to the propulsion system.

A propulsion system of the robotic pool cleaner may propel the robotic pool cleaner along a floor of a pool (block 110).

If the motion of the robotic pool cleaner does not change direction, the operation of the propulsion system continues (block 110).

The controller of the robotic pool cleaner or another mechanical, electrical, electronic mechanism may change, e.g., reverse, the direction of motion of the robotic pool cleaner (block 120). For example, the change in direction may be triggered by contact with a wall of the pool, a boundary of a region of operation of the robotic pool cleaner, or otherwise. When the motion changes direction, an inlet opening that previously functioned as a leading inlet opening may now be a trailing inlet opening (or, e.g., a lateral inlet opening that neither leads or trails, e.g., in a robotic pool cleaner that is configured for motion along more than one axis), and a different inlet opening may become the leading inlet opening.

After the change in direction, the inlet control mechanism may operate to enable inflow through the new leading inlet opening (or several inlet openings that are arranged along a leading end of the robotic pool cleaner), and to prevent inflow through trailing and other inlet openings (block 130). The propulsion system may then continue to operate (block 110).

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A pool cleaner comprising:
a housing comprising a plurality of inlets to enable inflow of water from a pool into the housing, and at least one outlet to enable outflow of water from the housing;
a suction mechanism for drawing water into the housing through the plurality of inlets, and for expelling the water through said at least one outlet;
a propulsion mechanism for propelling the pool cleaner over a floor of a pool;
a controller to control operation of at least the propulsion mechanism;
at least one filter for trapping debris in the water that is drawn into the housing; and
an inlet control mechanism configured to enable the inflow of the water via a selected inlet of the plurality of inlets while preventing inflow through at least one other inlet of the plurality of inlets, the inlet control mechanism being configured to enable inflow through a leading inlet of the plurality of inlets that is nearest to a leading end of the pool cleaner when the pool cleaner is being propelled, and to prevent inflow through a trailing inlet of the plurality of inlets that is nearest to a trailing end of the pool cleaner.

2. The pool cleaner of claim 1, wherein the inlet control mechanism is coupled to the propulsion mechanism by a coupling such that a reversal of direction of motion of the pool cleaner causes the inlet control mechanism to enable inflow through an inlet of the plurality of inlets that is the leading inlet after the reversal of the direction of motion, and to prevent inflow through an inlet of the plurality of inlets that is the trailing inlet after the reversal of the direction of motion.

3. The pool cleaner of claim 2, wherein the coupling comprises a mechanical coupling.

4. The pool cleaner of claim 3, wherein the mechanical coupling comprises an axle that is rotatable by the propulsion mechanism.

5. The pool cleaner of claim 4, wherein the mechanical coupling further comprises two actuator arms that are each coupled to the axle via a unidirectional coupling, such that rotation of the axle in one direction rotates one of the two actuator arms, and such that rotation of the axle in an opposite direction rotates the other of the two actuator arms.

6. The pool cleaner of claim 5, wherein each of the two actuator arms is configured to engage a disk of the inlet control mechanism after the reversal of the direction of motion to rotate the disk in a direction of rotation of that actuator arm so as to enable the inflow through the leading inlet and to prevent the inflow through the trailing inlet.

7. The pool cleaner of claim 6, wherein each of the two actuator arms comprises a projection that is configured to engage a different tab on the disk during at least a first rotation after the reversal of direction.

8. The pool cleaner of claim 6, wherein the disk is coupled to a crank that is configured to move a component to enable the inflow through the leading inlet and to prevent the inflow through the trailing inlet.

9. The pool cleaner of claim 1, wherein the controller is further configured to operate the inlet control mechanism in accordance with a direction of motion of the pool cleaner.

10. The pool cleaner of claim 9, wherein the inlet control mechanism comprises an electromechanical actuator.

11. The pool cleaner of claim 10, wherein the actuator comprises a servomotor.

12. The pool cleaner of claim 10, wherein the actuator comprises a solenoid.

13. The pool cleaner of claim 1, wherein each inlet of the plurality of inlets comprises a one-way valve to enable inflow of water through that inlet, and to prevent outflow of water through that inlet, wherein the inlet control mechanism is configured to prevent inflow through that outlet by locking closed the one-way valve.

14. The pool cleaner of claim 13, wherein the one-way valve comprises a flap, wherein the inlet control mechanism comprises at least one tab that is slidable onto the flap to lock the flap in a closed position.

15. The pool cleaner of claim 14, wherein said at least one tab comprises two tabs at opposite ends of a rod, wherein the inlet control mechanism is configured to slide the rod along its length to slide one of the tabs onto a flap nearest to one end of the of pool cleaner while removing the other tab from a flap nearest to an opposite end of the pool cleaner.

16. The pool cleaner of claim 1, wherein the inlet control mechanism comprises a plurality of covers, each of the covers being placeable over an inlet of the plurality of inlets.

17. The pool cleaner of claim 16, wherein two covers of the plurality of covers are located at opposite ends of a rod, wherein the inlet control mechanism is configured to slide the rod along its length to slide one of the two covers onto an inlet of the plurality of inlets that is nearest to one end of the of pool cleaner while removing the other cover of the two covers from an inlet of the plurality of inlets that is nearest to an opposite end of the pool cleaner.

18. A method of controlling inflow through inlets of a pool cleaner, the method comprising:

by a controller of the pool cleaner, operating a propulsion mechanism of the pool cleaner to propel the pool cleaner over a floor of a pool concurrently with operation of a suction mechanism to draw water into a housing of the pool cleaner through a plurality of inlets and into a filter configured to trap debris in the water, and to expel the water through an outlet of the housing so as to trap the debris in the filter; and when the propulsion mechanism reverses a direction of motion of the pool cleaner, controlling, by the controller, an inlet control mechanism of the pool cleaner to enable inflow of the water via a leading inlet of the plurality of inlets while preventing inflow through a trailing inlet of the plurality of inlets.

19. The method of claim 18, wherein controlling the inlet control mechanism comprises enabling a one-way valve of the leading inlet to open to enable the inflow, and preventing the inflow comprises preventing the one-way valve of the trailing inlet from opening.

* * * * *